L. H. UPTON.
SPRING SUSPENSION.
APPLICATION FILED JAN. 11, 1913.
1,180,888.
Patented Apr. 25, 1916.
2 SHEETS—SHEET 2.
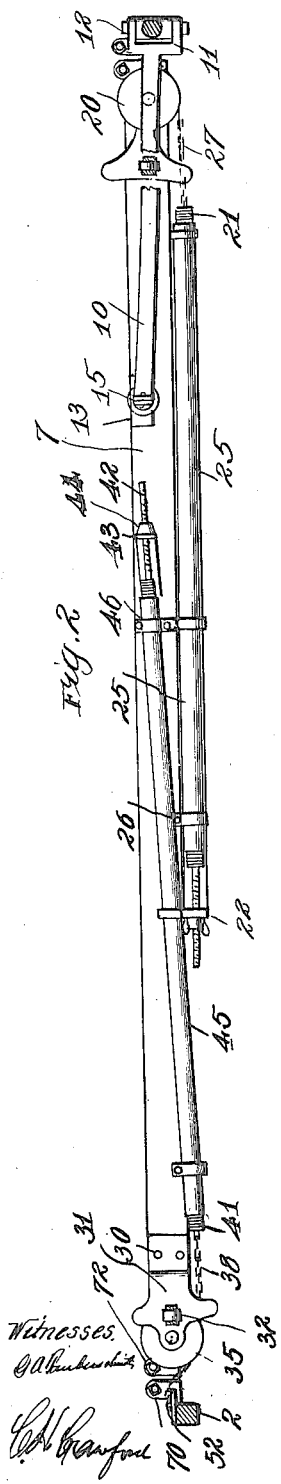
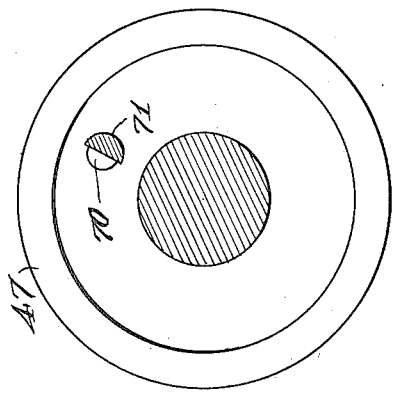
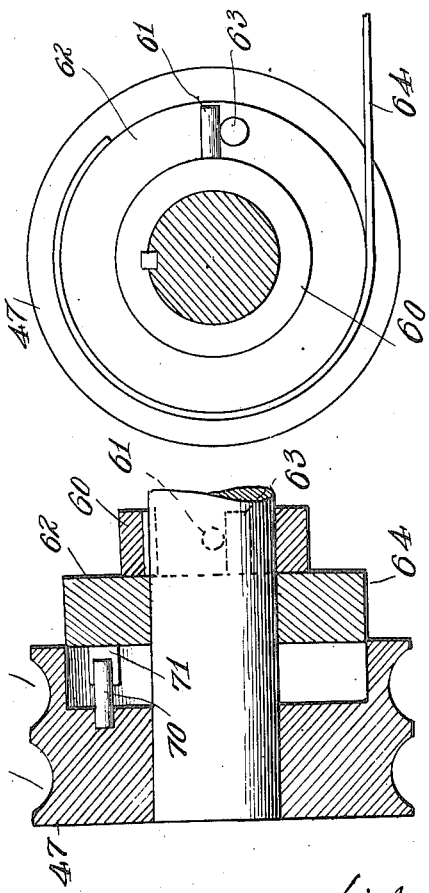
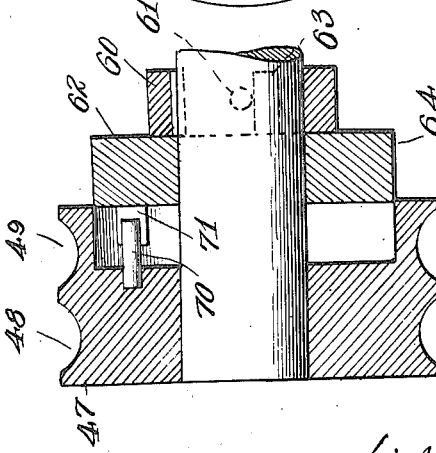
INVENTOR
Linford H. Upton.

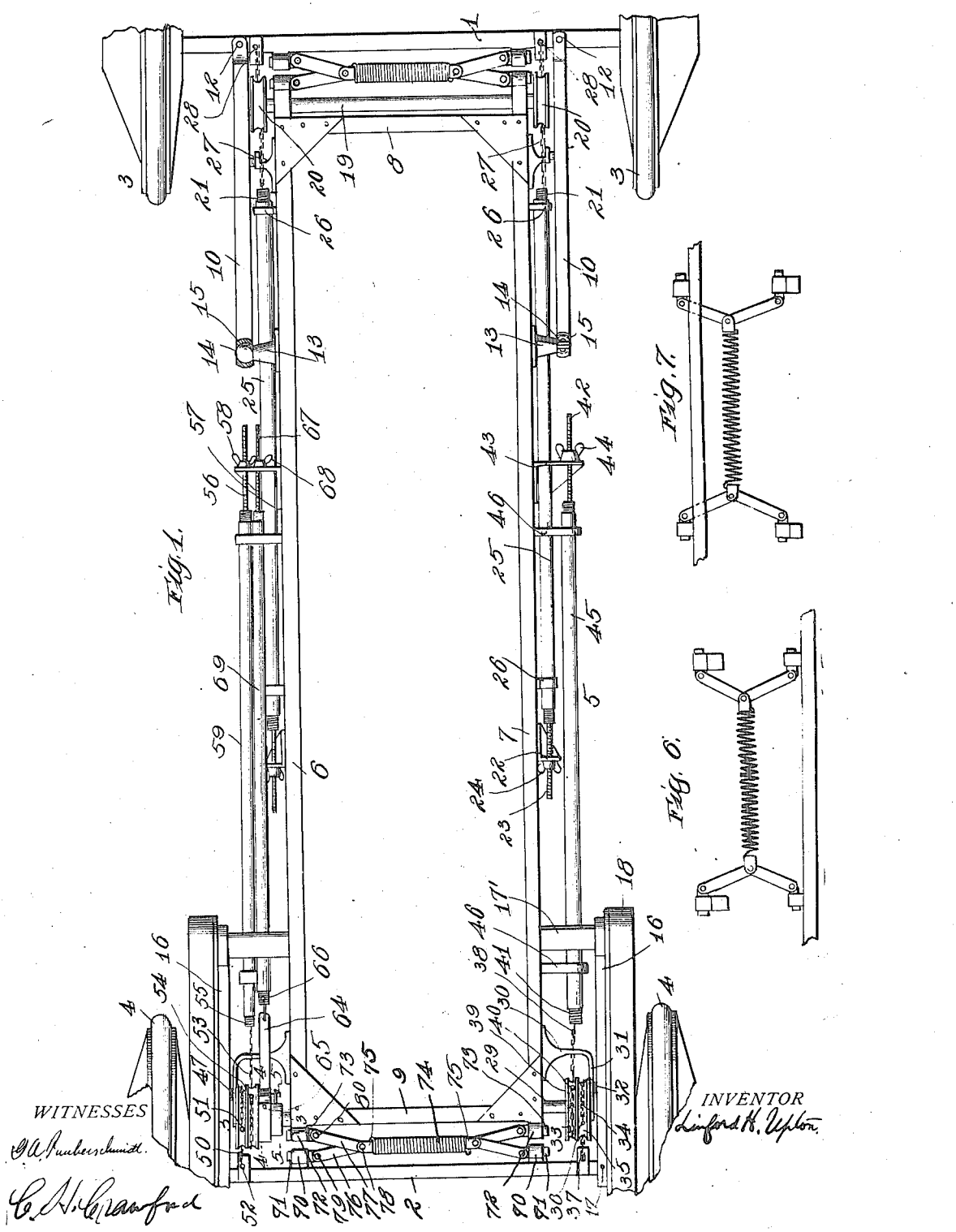

UNITED STATES PATENT OFFICE.

LINFORD H. UPTON, OF CONSTANTINE, MICHIGAN.

SPRING SUSPENSION.

1,180,888.  Specification of Letters Patent.  Patented Apr. 25, 1916.

Application filed January 11, 1913. Serial No. 741,375.

*To all whom it may concern:*

Be it known that I, LINFORD H. UPTON, a citizen of the United States, residing at Constantine, in the county of St. Joseph and State of Michigan, have invented new and useful Improvements in Spring Suspension, of which the following is a specification.

This invention relates to an improved spring suspension for vehicles and has to do with an improved spring suspension in which spiral tension springs are used in the place of leaf springs.

It is one of the objects of the invention to provide a spring suspension employing movable or rotary elements and flexible connections interposed between the axles, springs and such rotary elements in such a manner as to cause the flexible elements to act in opposition for the purpose of supporting the body upon the axle.

A further object of the invention is to provide an equalizing means adapted to distribute the spring action in such a manner as to maintain the body on a substantially constant level irrespective of the disposition of the load in the body as regards the sides thereof.

A further object of my invention is to provide auxiliary springs, the functions of which are to act as supporting springs when the body dips below its middle position or normal level, to act as centralizers to keep the body in a laterally central position when the body is near its normal level, and to act as recoil springs when the body rises above its normal level, owing to the various causes which may cause an upward or downward movement of the body.

Other features and objects of my invention will be more fully described in connection with the accompanying drawings, and will be more particularly pointed out in and by the appended claims.

In the drawings: Figure 1 is a plan view of a spring suspension shown applied to a vehicle in accordance with the preferred form of my invention. Fig. 2 is a side elevation thereof. Fig. 3 is a sectional view on line 3—3 of Fig. 1. Fig. 4 is a sectional view on line 4—4 of Fig. 1. Fig. 5 is a sectional view on line 5—5 of Fig. 1. Figs. 6 and 7 are end views, shown diagrammatically, illustrating the action of the auxiliary springs when the body rises above and descends below a normal level.

Like characters of reference designate similar parts throughout the different figures of the drawings.

As illustrated, 1 designates a front axle and 2 a rear axle, and 3 and 4 designate the front and rear wheels, respectively.

The body proper of the vehicle is omitted for clearness of illustration and a body frame, which will be referred to as the body, is shown and is generally indicated at 5 and may include longitudinal lateral members 6 and 7, and front and rear transverse members 8 and 9, respectively. Distance links 10 connect the body frame with the front axle and the front ends of the links are preferably bifurcated, as indicated at 11, to embrace the front axle and provide for a pivotal mounting therewith, the pivot being indicated at 12. The rear ends of the distance links 10 are connected with the lateral members 6 and 7 of the body frame by means of brackets 13, the brackets having a ball and socket connection with the links 10, as indicated at 14 and 15. By means of this construction the front axle and the body frame are maintained in definite relation with respect to each other.

The rear axle 2 is connected with the body frame by distance links or arms 16 which are pivotally connected with the axle 2, at 17, and which may conveniently embrace or be journaled on a sleeve 17' of the drive shaft. Preferably I mount a chain guard or casing 18 adjacent each distance link 16, as illustrated.

First referring to that part of the suspension for the front of the vehicle, 19 designates a shaft which may be conveniently fixed in the longitudinal members 6 and 7 and which carries journaled on its outer ends, chain line or cable drums or suspension elements 20. Front suspension springs of the spiral or coil type are indicated at 21 and are adjustably connected to the body at their ear ends by brackets 22 and threaded rods and nuts 23 and 24, respectively. In order to protect the springs 21 I preferably provide casings therefor, as indicated at 25, and supports 26 serve as mountings for the spring casings 25 and are attached to the body frame. The front ends of the springs 21 are connected to supporting lines which may be in the form of chains 27 which pass under the oscillatable drums or pulleys 20 and which are secured at their ends at 28, to the top portions of the axle 1. The forward spring suspension devices, on both sides, are identical in construction and operation.

An oscillatable drum or pulley shaft 29 is freely mounted in suitable bearings in the rear of the body frame 5 and is carried at its ends in hanger brackets 30 secured to the body 5. The hanger brackets 30 are provided with bearing shoes 31 adapted for engagement with suitably disposed rollers 32, on the distance arms 16, so as to maintain the body in a laterally central position.

A double oscillatable suspension drum 33 is fixed on one end of the shaft 29 and a suspension line, which may be in the form of a chain 34, is reeved about one groove 35 of the drum, in one direction, and is fixed to the drum at 36. The opposite end of the suspension chain is fixed to the axle 2, as indicated at 37. The load or the weight of the body will tend to cause the axle line or suspension chain 34 to rotate the drum 33 clockwise and unwind the chain 34. This action is counteracted by a spring suspension line preferably in the form of a chain 38 which is reeved about the groove 39 in a direction opposite to the reeving of the chain 34, and is secured to the drum 33 at 40. The opposite end of the chain 38 is secured to one end of a rear suspension spring 41, having its opposite end connected with a threaded rod 42, adjustably connected to a bracket 43, by a nut 44. A casing 45 incloses the spring throughout the major portion of its length and the casing is supported on the body of brackets 46. On the opposite end of the shaft 29 is loosely mounted a suspension drum 47 having suspension line or chain grooves 48 and 49. An axle suspension line or chain 50 is reeved about the drum 47 in one direction and is secured at 51 to the drum at one end thereof. The opposite end of the suspension chain is secured to the axle 2, at 52.

A spring suspension line or chain 53 is reeved about the drum 47 on the groove 49 in a direction opposite to the direction of reeve of the chain 50 and is secured to the drum at 54. The opposite end of the spring suspension line 53 is secured to one end of a coil spring 55 having its other end connected with an adjusting rod 56, extending through a bracket 57, and adjustable therein by a nut 58. A casing 59 incloses the major portion of the spring 55.

It will be noted that the reeving of the suspension and axle lines about the drum 47 is the same as the reeving of the axle and suspension lines about the drum 33, so that the tendency of the load will be to cause the axle suspension lines 34 and 50 to unwind and turn the drums clockwise whereas this action will be counteracted by the action of the spring suspension lines 38 and 53 tending to unwind under the action of their springs and turn the drums in an opposite direction. However, the drum 47 is loose on the shaft whereas the drum 33 is fast on the shaft so that the shaft is actuated positively only by the drum 33.

An equalizing spring device, which also acts as a suspension spring device in the preferred construction, is provided to prevent tipping of the body to one side when a greater load is disposed on one side than the other, and the function of the equalizing device is also to supplement the action of either or both of the suspension springs 41 and 55.

A retaining collar 60 is fast on shaft 29 and is provided with a pin 61. An equalizer drum 62 is loosely mounted on shaft 29 and is provided with a pin 63, adapted to be engaged by the pin 61, so as to prevent rotation of the equalizer drum 62 in a contra-clockwise direction independently of the shaft 29 of the retaining drum 60, the construction permitting independent rotation of the drum 62, in a clockwise direction with respect to the retaining collar 60. A flexible equalizer band 64 is wound about the equalizer drum 62 and is secured thereto at 65, the reeving or wind of the band 64 being in the same direction as the reeving or winding of the suspension lines 38 and 53. The opposite end of the band 64 is connected with an equalizer spring 66 having its opposite end connected with an adjusting rod 67 which is adjustable in the bracket 57 by means of a nut 68. A casing 69 serves to inclose the major portion of the length of the spring 66.

Means is provided for coupling the equalizer drum 62 and the suspension drum 47 to prevent independent movement thereof with respect to each other in one direction. The drum 47 is preferably hollowed out and provided with a suspension pin 70 adapted for engagement with an equalizer pin 71, the suspension pin 70 being mounted on the drum 47 and the equalizer pin 71 on the drum 62. Under the load of the weight of the body the suspension springs 41 and 55 will always be under tension and the equalizer spring 66 will also be under tension. This will result in engagement of the pins 70 and 71, and the pins 61 and 63, under all conditions.

Assuming now that an occupant entered the car and sat upon the right hand side thereby imposing a greater load at the right than at the left, then the drum 33 would be turned against the action of spring 41, in a clockwise direction. This turning of the drum 33 would turn the shaft 29 but would not positively effect the drum 47. However, the clockwise turning movement of shaft 29 would turn the retaining collar 60 and pins 61 and 63 and would wind the band 64 about the equalizer drum 62, the latter turning in a clockwise direction thereby adding a further tension to the equalizer spring 66. Thus the drum 47 and the spring 55 would be free from action by the equalizer, and the weight on the right hand side of the car would be supported by the combined action of suspension spring 41 and equalizing spring 66. The pins 70 and 71 would permit a winding movement of the equalizer drum 62 without in any way effecting the suspension drum 47. By reason of the fact that the spring 55 is released from any assistant action of the equalizer spring 66, when the load is disposed at the right of the body, it will then be seen that the spring 55 will then permit clockwise rotation of the drum 47, so that the empty side of the body will descend and be on a level with the right side of the body.

If a person entered the car and sat upon the left hand side, then the tendency would be to turn the suspension drum 47 in a clockwise direction thereby further tensioning suspension spring 55. The equalizer spring 66 would supplement the action of spring 55 by reason of the fact that turning movement of the drum 47 would impart a corresponding turning movement to the equalizer drum 62 through the pins 70 and 71. This action would not positively effect the shaft 29, or the suspension drum 33, because the pin 63 is free to turn in a clockwise direction in advance of the retaining pin 61 but not in a contra-clockwise direction with respect thereto. Thus the drum 33 and its spring 41 would be freed from any assistant action of the equalizer spring 66 and the drum 33 would therefore turn in a clockwise direction and permit the right hand side to descend.

When the load is equally or centrally disposed in the body, the equalizing spring supplements, equally, the action of the rear suspension springs. When a greater load is disposed on one side than on the other, then the suspension spring adjacent the greater load is assistantly supplemented by the equalizer spring and the suspension spring adjacent the lesser loaded portion is free from such assistant action by the equalizer spring. Neither of the rear suspension springs will act as free agents, apart from and independently of the equalizer spring when the load on one side only slightly exceeds that on the other side, and in such case, the equalizer spring would supplement both suspension springs but it would render slightly greater assistant action to that suspension spring adjacent the side of imposition of the greater load. In other words, when one side is loaded heavier than the other, the equalizer spring divides its support between two sides giving the greater part of its support to the side having the heavier load, up to the point where the excess load on one side equals or exceeds the strength of the equalizer spring, when the equalizer spring gives all its support to the side having the heavier load and none to the side having the light load. It will thus be seen that the equalizer spring 66 acts not only as a supplemental suspension spring but as an equalizer or leveler to maintain the body substantially on a level irrespective of any unequal disposition of the load within the limits of the action of the equalizer spring.

At the rear and front of the vehicles, I provide spring devices which act as recoil springs, when the body is suddenly or otherwise forced upwardly above its normal level, the said springs serving to hold the body in a longitudinal central position against lateral movement when the body is on a normal level, the springs serving as auxiliary suspension springs when the body sinks below a normal level. As these spring devices, both in front and rear, are of identical construction, only one need be described in detail and I will describe the rear device.

On the rear axle 2 I provide pivot bearing lugs 90 in which pivot pins 91 are adapted to rotate about horizontal axes. Likewise on the body I provide pivot bearings 72 in which pivot pins 73 are adapted to rotate about horizontal axes. An auxiliary spring of the spiral form is indicated at 74 and the ends thereof are connected by straps 75 to which links 76 and 77 are pivoted at 78. The links 76 and 77 are pivoted at 79 and 80 to the pivot pins 71 and 73, respectively.

When the car body is at a normal level or middle position, the springs 74, which are at all times under tension, have a tendency to yieldingly hold the body in a laterally central position. If an obstruction in the road causes the body to rise above a normal level, the pivot pins turn and permit the links 76 and 77 to open out or spread on their pivots 78 to bring the pivots 78 closer to the pivots 79 and 80. This further tensions springs 74 and causes the latter to absorb the shock of upward rise of the body and the recoil of the springs 74 serve, in addition to gravity, to return the body to a normal level. When the body dips or sinks below a normal level the link bars 76 and 77 spread in precisely the same manner as hereinbefore described thereby further tensioning springs 74 and causing the same to act as supplemental supporting springs and also to absorb the shock and act to return the body to a normal level. The up and down positions are shown in Figs. 6 and 7.

It will be seen that the fore and aft distance links 10 and 16 serve to hold the axles and body in predetermined longitudinal relation with respect to each other, while the main suspension springs and the auxiliary springs sustain the body as against up and down and lateral movement, respectively, in a manner to support the body so as to impart to the rider the nearest possible approach to a floating sensation with shocks and jars reduced to a minimum.

It will be seen that the chain 27 and spring 21 constitute a spring suspension line member which is secured to the body and to the front axle and that the pulley 20 constitutes a supporting element mounted upon the body and supporting the latter by its engagement with the suspension line. The chain 38 and the spring 41 and the chain 53 and the spring 55 also constitute spring suspension lines while the chain 50, and the chain 34, constitute axle lines, the suspension lines and the axle lines acting with rotatable members to support the body by their opposing action on said members. It will also be seen that the spring 66 and the band 64 constitute a spring equalizer line in their action upon the equalizer drum 62.

It will be seen that the front and rear axles are spaced apart from the body, at the front and rear thereof, and that the axles are unconnected with each other thereby leaving a free and unrestricted space between the axles for downward movement therebetween of the body, the latter being yieldingly supported on the axles for vertical movement above and below the same. It will also be seen that the front and rear auxiliary springs are connected with the body and axles by pivoted expanding link devices which tension these springs to render the same active with an increasing opposition against raising or lowering movement of the body, above or below the middle position, respectively.

While I have herein shown and described one specific embodiment of my invention, I do not wish to be limited thereto except for such limitations as the claims may import.

I claim:—

1. A spring suspension for vehicles comprising in combination, a body supporting frame, front and rear axles therefor, a distance device for retaining the frame and axles in predetermined relation with respect to each other, a spring suspension line member secured to the frame and to one axle, and a suspension element movably mounted on the frame and engaging said member to support the frame.

2. A spring suspension for vehicles comprising in combination, a body supporting frame, front and rear axles therefor, distance devices for retaining the frame and axles in predetermined relation with respect to each other, a spring suspension line member secured to the frame and to one axle, and means mounted on the frame and engaging said line member to support the frame at the front end thereof, substantially as described.

3. A spring suspension for vehicles comprising in combination, a body supporting frame, an axle therefor, a distance device for maintaining the axle in predetermined relation with respect to the frame, a spring suspension line member secured to the frame and to the axle, and a suspension element on the frame for engaging said line member to support the frame, substantially as described.

4. A spring suspension for vehicles comprising in combination, a body supporting frame, an axle therefor, a distance device for retaining the frame and axle in predetermined relation with respect to each other, a spring suspension line member secured to the frame and to the axle, and a pulley rotatively mounted on the frame and engaging said line member to support the frame, substantially as described.

5. A spring suspension for vehicles comprising in combination, a vehicle body supporting frame and an axle therefor, means for connecting the axle with said frame, a spring line suspension member connected with the frame and axle, and means carried by the frame and supporting the same by engagement by said line member, substantially as described.

6. A spring suspension for vehicles, comprising in combination, a vehicle body supporting frame and an axle therefor, means pivotally connected with the axle and frame, a spring line suspension member connected with the frame and axle, and means carried by the frame supporting the same by engagement with said line member, substantially as described.

7. A spring suspension for vehicles comprising in combination, a vehicle body supporting frame and an axle therefor, a suspension element carried by said frame and oscillatable or rotatable about a fixed axis thereon, an axle, a suspension line member fixed about said element in one direction and to said axle, and a spring suspension line member fixed about said element to act in opposition to said axle suspension line and also being fixed to said frame, substantially as described.

8. A spring suspension for vehicles comprising in combination, a vehicle body supporting frame and an axle therefor, a rotatable suspension element carried by said frame, an axle, a suspension line member fixed about said element in one direction and to said axle, and a spring suspension line member fixed about said element to act in opposition to said axle suspension line and also being fixed to said frame, substantially as described.

9. A spring suspension for vehicles comprising in combination, a vehicle body supporting frame and an axle, rotary suspension elements carried by said body, suspension line members connected with said axle and with said elements to cause rotation of the latter under a load in one direction, spring line suspension members connected with said frame and connected with said elements to rotate the same in opposition to the action thereon by said axle line members, and an equalizing mechanism operatively connected with both of said elements, substantially as described.

10. A spring suspension for vehicles comprising in combination, a vehicle body supporting frame and an axle, movable suspension devices carried by said frame and connected with said axle and adapted to be moved under load of the frame in one direction, spring line suspension members connected with said devices and with said frame to move said devices in opposition to the direction of movement imparted thereto under imposition of the load of the frame, and equalizing mechanism operatively connected with said devices, substantially as described.

11. A spring suspension for vehicles comprising in combination, a vehicle body supporting frame and an axle, rotary suspension devices movably mounted on said frame and movably connected with said axle to be moved under imposition of the load of the frame in one direction, spring suspension members connected with the frame and connected with said devices to move them in opposition to the direction of movement imparted thereto by the imposition of the load, and equalizing mechanism having independent connection with said devices, substantially as described.

12. A spring suspension for vehicles comprising in combination, a vehicle body supporting frame and an axle therefor, suspension devices movably connected with the axle and frame and adapted to be moved in one direction under imposition of the load from the frame, spring suspension mechanism connected with the frame and with said devices to move the latter in opposition to the direction of movement imparted thereto by the load, equalizing mechanism, and mechanism for rendering the equalizing mechanism operatively assistant to that spring suspension mechanism sustaining the greater load, substantially as described.

13. A spring suspension for vehicles comprising in combination, a vehicle body supporting frame and an axle therefor, unyielding suspension devices movably connected with the axle and said devices and adapted to be moved in one direction under imposition of the load from the body, spring suspension mechanism connected with the frame and with said devices to move the latter in opposition to the direction of movement imparted thereto by the load, spring equalizing mechanism, and mechanisms for rendering the equalizing mechanism operatively assistant to that spring suspension mechanism sustaining the greater load, substantially as described.

14. The combination, in a vehicle spring suspension, of a frame, an axle, a universal joint attached to the frame, a universal joint attached to the axle, a spring, links joining the spring to the universal joints respectively, and a distance device pivoted to the frame and adapted to guide the universal joint on the axle through the plane of the other universal joint and the pivot of the distance device, substantially as described.

15. The combination in a vehicle spring suspension, of a frame, an axle, a spring suspension line attached at one end to the frame and at the other end to the axle, a pulley attached to the frame and adapted to engage the spring suspension line, a universal joint attached to the frame, a universal joint attached to the axle, a spring, links joining the spring to the universal joints respectively, and a distance device pivoted to the frame and adapted to guide the universal joint on the axle through the plane of the other universal joint and the pivot of the distance device, substantially as described.

16. A spring suspension for vehicles comprising in combination, a body supporting frame, front and rear axles therefor, a distance device for retaining the frame and axles in predetermined relations with respect to each other, a spring suspension line member secured to the frame and to one axle, a suspension element movably mounted on the frame and engaging said member to support the frame, a toggle, a universal joint connecting the toggle to the frame, a universal joint connecting the toggle to the axle, and a spring adapted to flex the toggle, substantially as described.

17. A spring suspension for vehicles comprising in combination, a frame and axles therefor, main spring suspension means for the frame, an auxiliary spring, links connected with said spring, pivoted devices each having two pivots with their axes in angular relation with respect to each other, one for connecting one of said links to the frame and the other for connecting another of said links to the axle, substantially as described.

18. The combination, in a vehicle spring suspension, of a frame, an axle, a universal joint attached to the frame, a universal joint attached to the axle, an extension spring, links joining the spring to the universal joints respectively and adapted to extend the spring as the universal joint attached to the frame moves either above or below the universal joint attached to the axle.

In testimony whereof I affix my signature in the presence of two witnesses.

LINFORD H. UPTON.

Witnesses:
CARL H. CRAWFORD,
MARGUERITE A. HEFLING.